United States Patent [19]

Rogers et al.

[11] 4,136,709

[45] Jan. 30, 1979

[54] FLANGE VALVE HAVING IMPROVED SEALING CHARACTERISTICS AND WEAR INDICATOR

[75] Inventors: Philip W. Rogers; Claude E. Parkin, Mexico City, Mexico

[73] Assignee: A. Dean Mammel, Dallas, Tex.

[21] Appl. No.: 695,973

[22] Filed: Jun. 14, 1976

[51] Int. Cl.² ............................................. F16L 7/00
[52] U.S. Cl. .................... 137/375; 251/315; 251/367; 116/208; 116/272; 116/DIG. 7
[58] Field of Search ........ 116/114 Q, 117 R, DIG. 7; 251/315, 367; 137/375

[56] References Cited

U.S. PATENT DOCUMENTS

| | | | |
|---|---|---|---|
| 1,616,386 | 2/1927 | O'Stroske | 251/315 |
| 1,784,381 | 12/1930 | O'Stroske | 251/315 |
| 3,014,690 | 12/1961 | Boteler | 251/315 |
| 3,151,837 | 10/1964 | Bentley-Leek | 251/315 |
| 3,157,190 | 11/1964 | Allen | 251/315 |
| 3,217,739 | 11/1965 | La Valley et al. | 137/375 |
| 3,367,359 | 2/1968 | Johnson | 251/315 |
| 3,385,313 | 5/1968 | Okada | 251/315 |
| 3,450,151 | 6/1969 | Heutzenroeder | 137/375 |
| 3,498,319 | 3/1970 | Schnabel | 137/375 |
| 3,780,985 | 12/1973 | Perry | 251/315 |
| 3,952,691 | 4/1976 | Peltz et al. | 116/117 R |

FOREIGN PATENT DOCUMENTS

953949  4/1964  United Kingdom ............ 251/315

*Primary Examiner*—William R. Cline
*Assistant Examiner*—H. Jay Spiegel
*Attorney, Agent, or Firm*—Richards, Harris & Medlock

[57] ABSTRACT

The specification discloses a flange valve having a metal valve body with a longitudinal central passage therethrough and annular flanges extending outwardly from the ends thereof. A truncated ellipsoid valve member is located in the central portion of the passage, the ellipsoid member having major and minor axes and being truncated at the opposite ends of the major axes. An aperture is formed through the ellipsoid member along the major axis. Annular resilient seats are disposed on opposing sides of the valve member to provide sealing between the interior of the valve body and the exterior of the valve member. A pair of removable annular liners are dimensioned to closely fit within opposite ends of the central passage of the valve body and include end portions abutting the resilient seats. The liners are constructed from non-corrosive material to prevent corrosion of the valve body. A handle is provided to rotate the valve member between open and closed positions, the major axis and the aperture being aligned with the passage in the open position and the seats being deformed by the valve member in the open position to provide improved sealing. A wear detector is provided in the walls of the valve body in order to provide an indication of when the valve body wears to a predetermined degree.

4 Claims, 25 Drawing Figures

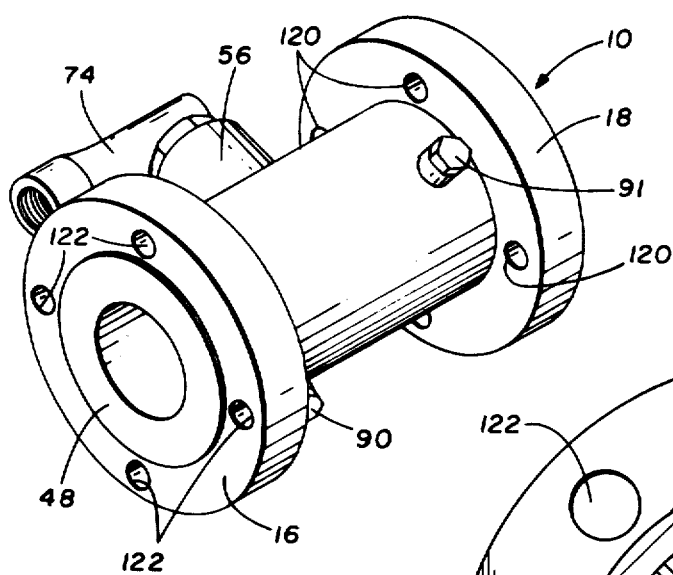
FIG. 3
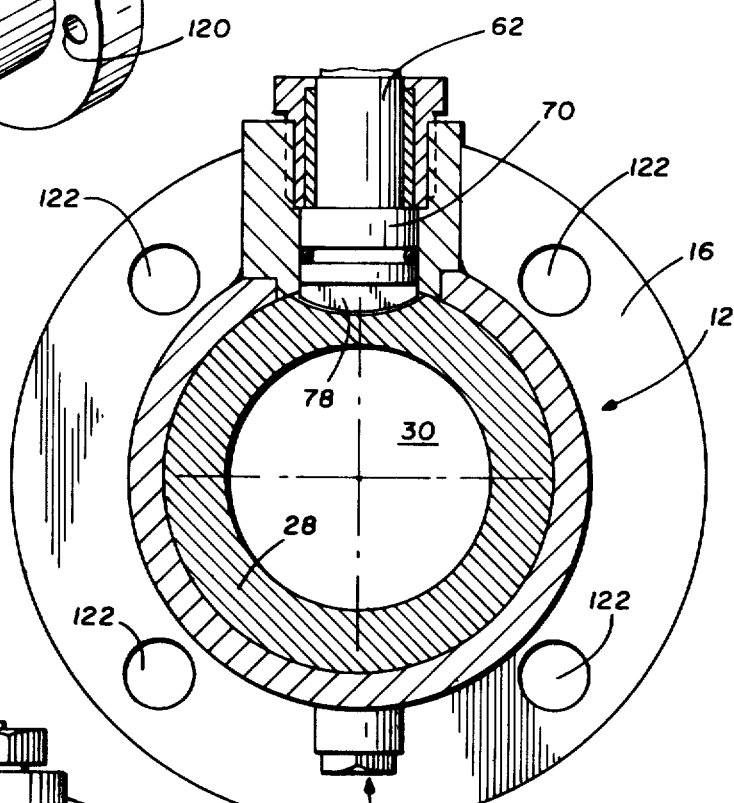
FIG. 4
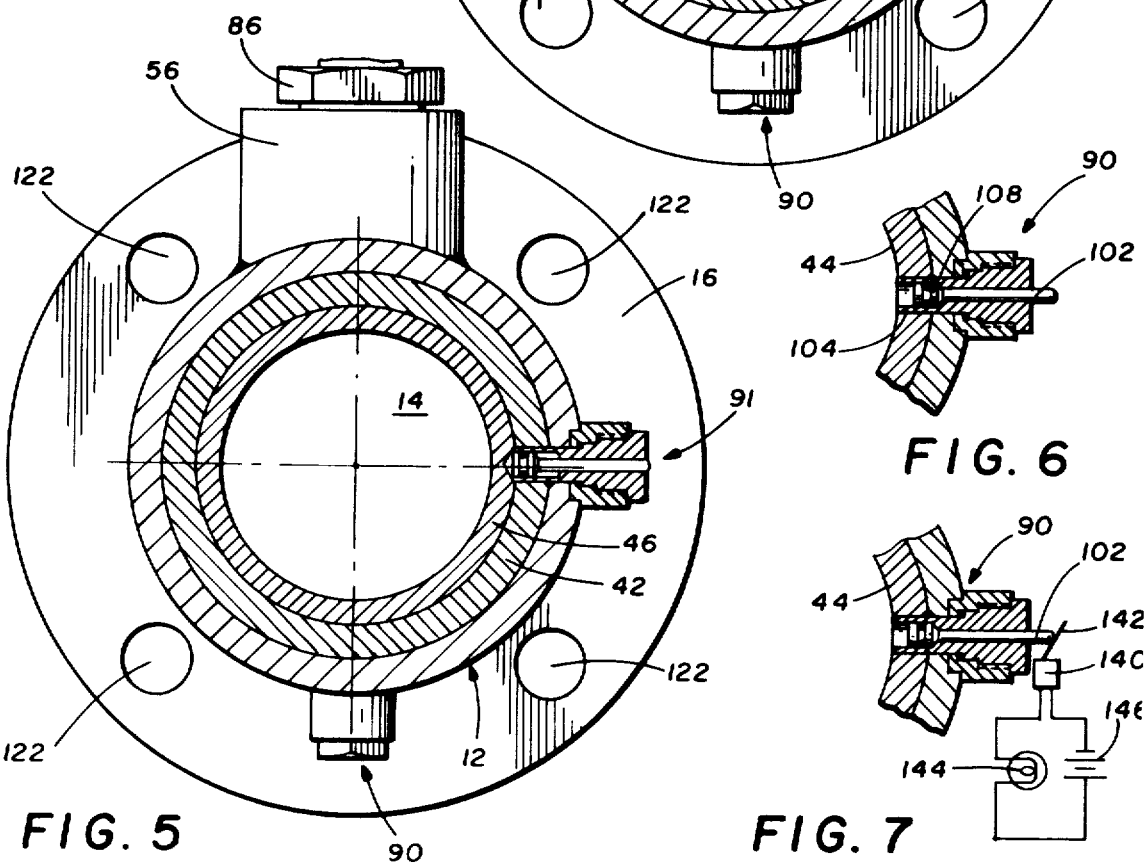
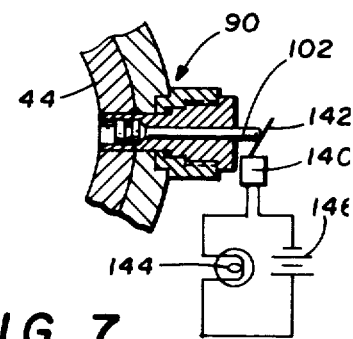
FIG. 6
FIG. 5
FIG. 7

FLANGE VALVE HAVING IMPROVED SEALING CHARACTERISTICS AND WEAR INDICATOR

FIELD OF THE INVENTION

This invention relates to valves, and more particularly relates to a flange valve with improved sealing in the open position and including a wear detector.

THE PRIOR ART

Flange valves have long been used in environments when it is necessary to valve high pressure fluids in relatively large conduits. Generally, such flange valves include radial flanges which are bolted to the ends of the conduits to be valved. When previously developed flange valves have been used with corrosive fluids, the valves have been subject to severe wear and rapid deterioration. To combat such corrosion, it has heretofore often been necessary to make such flange valves entirely from expensive, hard to machine, non-corrosive materials such as stainless steel. Due to the pressures involved, such stainless steel valve bodies are often required to be cast, thereby requiring an almost prohibitively expensive final product. A need has thus arisen for a flange valve capable of withstanding very high pressures with corrosive fluids which may be primarily constructed from metals less expensive than stainless steel.

With prior flange valves and other types of valves, it has also not been heretofore possible to practically determine when a valve body is worn to an extent that it should be replaced. A need has thus arisen for a wear detector which provides a visual or audible warning signal indicating when a valve is worn and needs to be replaced, without the requirement of removing the valve from the conduit for inspection.

Ball valves are also commonly used in many different applications for valving liquid and gases in pipelines or other conduits. Such ball valves generally include a spherical valve member with an aperture extending therethrough, along with a seal to reduce leakage of the valve in the closed position. Such conventional ball valves have generally been limited to valve apertures which have a smaller diameter than the internal diameter of the conduit attached to the valve. Such reduced apertures cause a flow restriction that creates increased back pressure in the conduit on the inlet side of the valve and a pessure drop on the discharge side of the valve. Such a pressure drop reduces the accuracy of measurements and metering of the fluid flow, and the resulting increased pressure intensifies the erosion and corrosion of such prior valves. To obtain full flow with prior valves, pipe reducers have been required, along with an oversize valve. Prior ball valves also have often included surfaces to which incrustation of extraneous flow material becomes deposited, thereby inhibiting operation of the valve.

Another very serious disadvantage of prior ball valves is leakage of the valve in the open position. Such leakage occurs due to the lack of an adequate seal between the interior of the valve housing and the exterior of the valve ball and thus fluid passes around the exterior surface of the valve ball when in the open position. This leakage of fluid causes corrosion and erosion due to fluid abrasion of the valve housing and the valve ball, and also results in excessive pressure against the valve handle stem, often causing leakage at the valve stem. Even when expensive non-corrosive metal is utilized for the valve housing and ball to counter corrosion, erosion can still occur due to valve leakage when the valve is utilized with high pressure abrasive fluid. Moreover, such prior ball valves have often not been easily disassembled and constructed so as to enable replacement of parts such as the ball valve, a problem which is magnified when the valve housing is so corroded and eroded that the entire valve must be replaced.

It has been theretofore proposed to utilize valve members having irregular shapes in order to produce increased sealing when the valve is placed in the closed position. Examples of such valves are described in U.S. Pat. No. 3,064,937 entitled "Rotary Valve" by C. C. Pryor; U.S. Pat. No. 3,157,380 entitled "Ball Valve" by R. B. Sivyer and U.S. Pat. No. 3,780,985 entitled "Valve With Ellipsoid Sealing" by Dean A. Perry. However, no provision is made in any of these prior designs for increased sealing when the valve is in the open position, and thus such prior valves are subject to leakage when in the open position, thereby resulting in corrosion and erosion of the valve housing. Moreover, such previously developed valves, due to their construction, have been difficult to rebuild or repair in the operational field.

SUMMARY OF THE INVENTION

In accordance with the present invention, a flange valve is herein disclosed which substantially eliminates or reduces the problems and inadequacies heretofore associated with previously developed flange valves.

In accordance with the invention, a flange valve includes a metal valve body with a longitudinal central axis therethrough. A valve member is pivotally mounted within the central passage and includes an aperture extending therethrough. Annular resilient seats within the passage contact end portions of the valve member. A pair of annular liners are dimensioned to closely fit within opposite ends of the central passage of the valve body and have end portions for abutting the resilient seats. The liners are constructed from non-corrosive material to prevent corrosion of the valve body. Structure is provided to rotate the valve member to open and closed positions.

In accordance with another aspect of the invention, a flange valve includes a valve body having a circular passage therethrough and annular flanges extending outwardly from the ends thereof. A valve member is rotatably suspended within the valve body and has an irregular configuration with major and minor axes extending transverse to one another. An aperture extends through the valve member along the major axis. Annular resilient seats are disposed on opposing sides of the valve member to provide sealing between the interior of the valve body and the exterior of the valve member. A pair of annular liners are dimensioned to closely fit within the opposite ends of the central passage of the valve body and include end portions for abutting the resilient seats. The liners are constructed from non-corrosive material to prevent corrosion of the valve body. Structure is provided to rotate the valve member between the open and closed positions, the major axis and the aperture being aligned with the passage in the open position and the seats being deformed by the valve member in the open position to provide increased sealing.

In accordance with yet another aspect of the present invention, a flange valve includes a metal valve body having opposed ends and a circular passage therethrough. Annular flanges outwardly extend from the ends of the valve body. Counterbores are formed in each of the opposed ends of the valve body to form annular shoulders therein. A truncated ellipsoid member is located in the central portion of the valve body within the passage. The ellipsoid member has major and minor axes and is truncated at the opposite ends of the major axis. Structure forms an aperture through the ellipsoid member along the major axis. Annular resilient seats are disposed in sealing relation with opposed ends of the ellipsoid member. Annular non-corrosive inserts are disposed in each end of the valve body and abut at one end the annular shoulders and at the other end the seats. A handle stem is rotatably extended through the side wall of the valve body and is removably coupled to rotate the ellipsoid member, wherein the ellipsoid member may be rotated between the open and closed positions.

In accordance with yet another aspect of the invention, a flange valve includes an outer flange housing with a central opening therethrough and a valve handle. A truncated ellipsoid member is dimensioned to be removably located within the outer housing, the ellipsoid member having major and minor axes and having an aperture extending along the major axis and truncated at the ends of the aperture. Annular resilient seats are dimensioned to removably fit within the housing in contact with the ellipsoid member. Removable annular liners are constructed from non-corrosive material and are removably tightly fitted within the central opening of the flange housing. The ellipsoid member includes structure for coacting with the valve handle for being rotated between open and closed positions, the ellipsoid member deforming the seats when in the open position to provide improved sealing. Each of the ellipsoid members, seats and liners may be easily removed from the flange housing for placement after wear.

In accordance with yet another aspect of the invention, a wear detector for a valve includes a valve body having a wall of a predetermined thickness. An aperture is formed in the wall to a depth less than the predetermined thickness. An indicator stem is slidably mounted within the aperture and is movable between an inward and an extended position. The stem is maintained in the inward position until the wall wears to an extent that the interior of the valve body communicates with the aperture, wherein the indicator stem is moved to the extended position to signal wear of the valve body. In one embodiment of the invention, an alarm is operated when the indicator stem moves to the extended position. In another embodiment of the invention, the extended position of the indicator stem provides a visual indication of valve wear.

In further accordance with the invention, flange valve seats are provided with metal springs which enable the present flange valve to be used in high temperature and pressure environments.

DESCRIPTION OF THE DRAWINGS

For a more complete understanding of the present invention and for further objects and advantages thereof, reference is now made to the following description taken in conjunction with the accompanying drawings, in which:

FIG. 3 is a perspective view of the present flange valve;

FIG. 4 is a sectional view taken generally along the section lines 4—4 in FIG. 1;

FIG. 5 is a sectional view taken generally along the section lines 5—5 shown in FIG. 1;

FIG. 6 is a sectional view of the wear detector of the present invention when in the extended position;

FIG. 7 is a second embodiment of the wear detector of the present system when used in conjunction with an electrical alarm system;

DESCRIPTION OF THE PREFERRED EMBODIMENT

Figure 1:
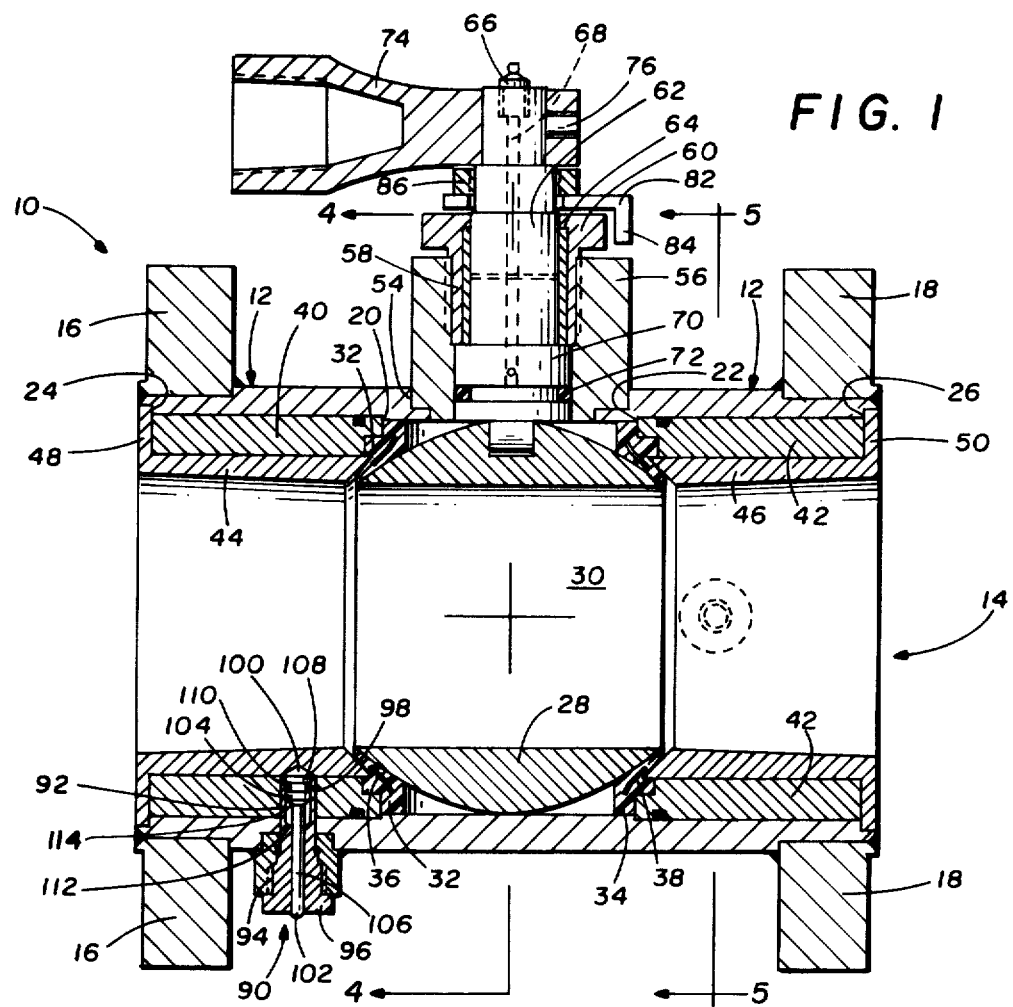
FIG. 1 is an elevational cross-sectional view of the present flange valve when in the open position.

Referring to FIG. 1, the present flange valve is indicated generally by the numeral 10 and includes a valve body 12 comprising a circular open ended metal housing with a central passage 14 extending therethrough. Annular flanges 16 and 18 are welded at opposite ends of the housing 12 and include apertures, to be subsequently described, for connection to a conduit. An important aspect of the present invention is the fact that housing 12 is not required to be made of expensive non-corrosive metal such as stainless steel, but may be formed from any one of a number of less expensive metals.

First counterbores are formed in each end of the housing 12 and form annular shoulders 20 and 22. Second counterbores are also formed in the ends of the housing to form annular shoulders 24 and 26.

An important aspect of the invention is the provision of a truncated ellipsoid valve member 28 which includes an aperture 30 extending therethrough. Annular flexible seals or seats 32 and 34 are positioned within the central passage 14 adjacent opposite ends of the ellipsoid valve member 28. In the preferred embodiment of the invention, annular metal springs 36 and 38 are formed within the seats 32 and 34, although it will be understood that springs 36 and 38 may be eliminated for certain environments of use.

Annular spacers 40 and 42 are inserted in the ends of housing 12 and abut against the annular shoulders 20 and 22 and also abut against the seats 32 and 34 in order to properly position the seats in the desired sealing position against the valve member 28. Annular liners 44 and 46 are also insertable within the ends of the housing 12 and abut at the ends thereof with seats 32 and 34. The liners include outwardly extending annular flanges 48 and 50 which abut against the annular shoulders 24 and 26 in order to properly locate the liner in the desired position. Each of the liners 44 and 46 are provided with a slight internal taper on the internal diameter thereof, the taper sloping from the interior ends of the liners outwardly to the flanges 48 and 50.

Another important aspect of the invention is that the liners 44 and 46 are made from non-corrosive material such as stainless steel, plastic or the like. The liners thus protect the interior of the valve housing from corrosion and erosion. Due to the fact that the liners 44 and 46 are relatively easy to fabricate and due to the fact that the liners are easy to remove, the liners may be removed from the valve housing when worn and replaced with new liners, without the requirement of replacing the entire valve body. The remaining interior portions of the valve, including the spacers, the seats and the ellipsoid valve member 28, are also removable for easy replacement without the requirement of replacing the entire valve.

An aperture 54 is formed through the walls of the housing 12. An extension 56 is affixed within the aperture 54. The extension 56 has an eccentric cross-section. An annular threaded aperture 58 is formed through the extension and a sleeve fitting 60 is threadedly engaged therewith. A valve stem 62 is disposed within the sleeve 60 and a bearing 64 is provided to allow ease of rotation of the valve stem. A grease fitting 66 allows lubrication to be introduced within the valve stem through an aperture 68 which communicates with the bearing 64. An enlarged diameter portion 70 of the valve stem includes an O-ring 72 to provide sealing. A handle 74 is attached by an Allen screw 76 to the valve stem. A stem extensive 78 extends into a recess 80 formed in the upper portion of the valve member 28. A flat plat 82 is connected about the valve stem and includes an upset end 84 for abutting against stops, not shown, on the extension 56 in order to designate the open and closed position of the valve. A nut 86 tightens the flat plate 82.

Another aspect of the invention is the provision of a wear indicator generally designated by the numeral 90. A second wear indicator 91 is provided on the other end of the valve. The wear indicators 90 and 91 are offset with one another to provide a more valid indication of wear. The indicators comprise an aperture 92 formed through the outer wall of the valve housing 12, through the spacer ring 42 and partially into the wall of the liner 44.

A drilled bushing 94 is received within a counterbore formed into aperture 92 and is tack welded to the exterior of the housing 12. An indicator sleeve is threadedly insertable into the bushing 94 and includes an extension 98 which extends to the bottom of aperture 92. The upmost buttom of the aperture 92 is provided with a conical portion 100 which extends into the liner 44 for a predetermined distance. The depth of the aperture 92 is less than the combined thicknesses of the housing wall, the spacer and the liner walls. The distance between the end of the conical portion 100 and the interior wall of the liner 44 will depend upon the amount of wear desired before providing an indication of wear.

An aperture 102 of reduced diameter is formed through the sleeve 96 and communicates with an aperture 104 of enlarged diameter. An indicator stem 106 is slidably received within aperture 102, while an enlarged diameter stem portion 108 is received by the aperture portion 104. An O-ring 110 is provided about the enlarged diameter stem portion 108 to prevent leakage. A conical face 112 is formed between the aperture portion 102 and 104. This face portion abuts with a conical shoulder 114 formed on the indicator stem to provide a seal therebetween.

Normally, the indicator stem 106 is in the withdrawn position illustrated in FIG. 1. When sufficient wear occurs on the interior walls of the liner 44, fluid pressure is communicated into the conical portion 100 and fluid pressure causes the large indicator stem portion 108 to be moved outwardly. This causes the indicator stem 106 to become extended outwardly in order to provide a visual indication of wear of the liner 44. This allows the valve to be removed from the conduit and a new liner to be placed in the valve before serious damage occurs.

The valve shown in FIG. 1 is illustrated in the open position. In this position, the aperture 30 of the valve member 28 communicates with the passage 14 formed through the valve body, the liners 44 and 46 and the seats 32 and 34. An important aspect of this flange valve is that the aperture 30 formed through the ellipsoid valve member 28 is provided with a diameter which is as great as the diameter of the conduits which are attached to the flanges 16 and 18. Due to the construction of the ellipsoid valve member 28, no substantial restriction is thus applied to the flow of materials through the valve from the conduits, thereby eliminating problems in changing the pressure of the material flow through the conduits.

Another important aspect of the flange valve shown in FIG. 1 is that, in the illustrated open position, the ellipsoid valve member 28, due to its construction as will be subsequently described, causes deformation of the flexible seats 32 and 34. As shown, the seats 32 and 34 include interior annular lips which are outwardly deformed by the edges of the ellipsoid valve member 28, thus causing a very tight seal between the seats and the valve member 28. This substantially prevents leakage between the ellipsoid valve member 28 and the valve body interior when the valve is in the open position. Thus, corrosion and erosion of the interior of the valve body 12 are thus substantially eliminated by use of the present valve.

Figure 2:
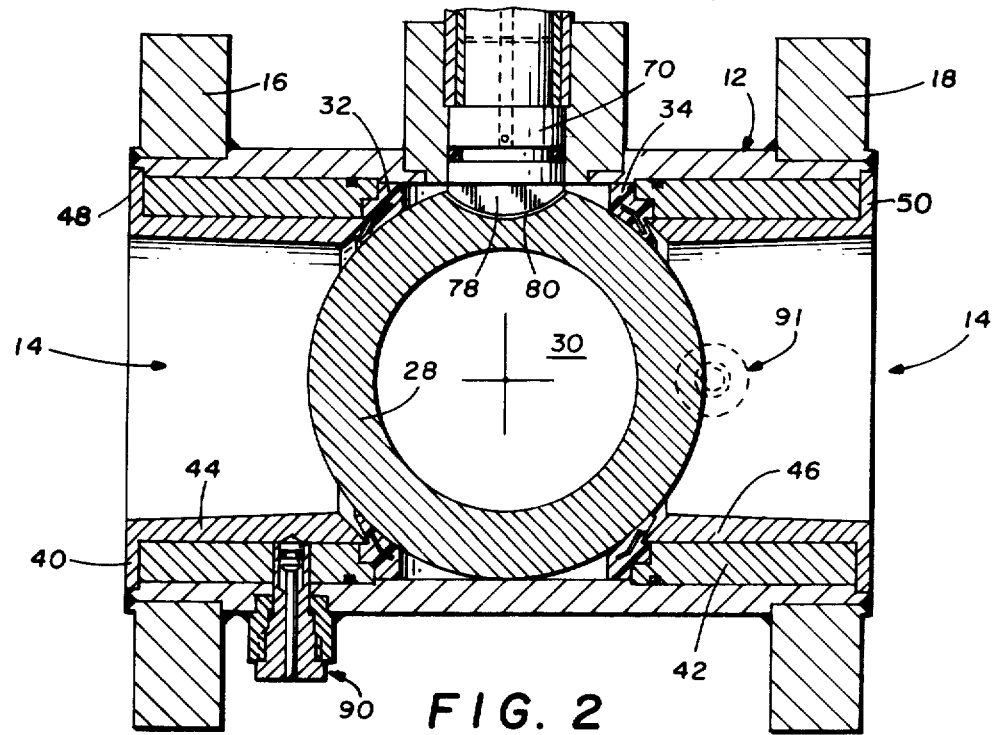
FIG. 2 is an elevational cross-sectional view of the present flange valve when in the closed position.

FIG. 2 illustrates the valve 10, with a portion of the handle removed for clarity of illustration, and with the ellipsoid valve member 28 being turned to the closed position by rotating it 90° relative to the position shown in FIG. 1. In the closed position, the aperture 30 of the valve member 28 is turned transverse to the flow of fluid through the passage 14. As shown in FIG. 2, the upper portion of the ellipsoid valve member 28 includes a curved cutout portion 80 which receives the extension 78 from the valve stem in order to enable turning of the ellipsoid valve member 28. In this position, the seats 32 and 34 are not as outwardly deformed as when in the open position shown in FIG. 1. However, the lips of the seats 32 and 34 in this position closely conform to the circular outer shape of the ellipsoid valve member 28 and thus provide substantial sealing to prevent fluid flow between the valve member 28 and the interior of the valve housing 12.

When the present valve is being used with highly corrosive fluids, upon closing of the valve small amounts of the corrosive fluid may remain within the aperture 30 and thus eventually contact the interior walls of the valve body 12. For such highly corrosive environments, it is desirable to provide a thin coating of non-corrosive material on the interior walls of the central portion of the valve body 12. A suitable non-corrosive coating has been found to be a coating of 0.002 inch thick material such as Tetrafluoroethylene, and known under the trademark "Teflon". Such a thin coating of non-corrosive material may be used on the present invention because there is no flow of material therepast to erode the coating, and the coating has only to withstand static corrosive fluid.

FIG. 3 illustrates a perspective view of the valve 10 and illustrates apertures 120 which are formed in flange 18 and apertures 122 formed in flange 16. Bolts are disposed through apertures 120 and 122 in order to connect the flange valve to conduits in the well-known manner. FIG. 3 also illustrates the handle 74 which may be rotated about a 90° arc in order to open and close the elliptical valve member 28 in the manner previously described. The flange 48 of the liner 44 is illustrated as abutting against the counterbore in the end of the flange 16. The liner 48 is prevented from movement outside the valve 10 when the valve 10 is connected to the conduit. FIG. 3 also illustrates the wear detectors 90 and 91 previously described.

FIG. 4 is a sectional view taken generally along section lines 4—4 of FIG. 1. The bolt apertures 120 and 122 are illustrated as being formed about the flange 16. The side walls of the valve housing 12 are illustrated, and the valve member 28 is shown in a sectional view. The aperture 30 through the valve member 28 is also illustrated, since the valve member 28 is in the open position. The extension 78 of the valve stem 62 is illustrated as being received by the cutout portion in the top of the valve member 28. The top portion of the handle is eliminated in this view for clarity of illustration. FIG. 4 also shows the position of the wear detector 90.

FIG. 5 illustrates a sectional view of the valve of FIG. 1 taken generally along the section lines 5—5. This view also illustrates the flange 16 and the aperture 122 in the manner previously illustrated. In the view, the side walls of the valve body 12 are illustrated, in conjunction with the sectional view of the walls of the insert 42 and the liner 46. This view illustrates how the interior surfaces of the valve housing 12 are protected by the insert 42 in the liner 46 which may be formed from non-corrosive material.

FIGS. 4 and 5 illustrate how the passageway 14 is provided with the same diameter as aperture 30 through the valve member 28 such that no restrictional flow occurs. FIG. 5 illustrates the wear detector 91 which is constructed in the identical manner as wear detector 90 previously described.

FIG. 6 shows the wear indicator 90 in the alarm position when a predetermined amount of wear has occurred in the wall of the liner 44 such that the interior passage 14 communicates with the enlarged diameter portion 104 of the aperture through the wear indicator. When this occurs, fluid pressure from the interior of the valve moves the enlarged diameter stem portion 108 of the indicator stem outwardly to seat against the annular surface 114. This seating, in combination with the O-ring 110, prevents leakage of the pressure from the interior of the valve. The indicator stem 102 in this position protrudes from the wear indicator to provide a visual indication of substantial wear to enable replacement of the liner before damage occurs.

FIG. 7 illustrates another embodiment of the wear indicator of the invention, wherein the wear indicator 90 is constructed in the identical manner as previously described. In this embodiment, however, a microswitch 140 is mounted on the outer end of the wear detector and includes a switch arm 142 which is actuated by the wear indicator stem 102. The microswitch 140 is connected to a circuit including an alarm light 144 connected in series with a battery source 146. Normally, when the valve indicator 102 is withdrawn into the wear indicator body, the microswitch 140 provides an open circuit such that the alarm light 144 is de-energized. When the wear indicator stem 102 protrudes in case of excess wear of the liner, the microswitch arm 142 is moved to close the circuit to provide current to energize the alarm light 144. It will be understood that an audio alarm and other types of alarms could be used in place of the light 144.

Figure 8:
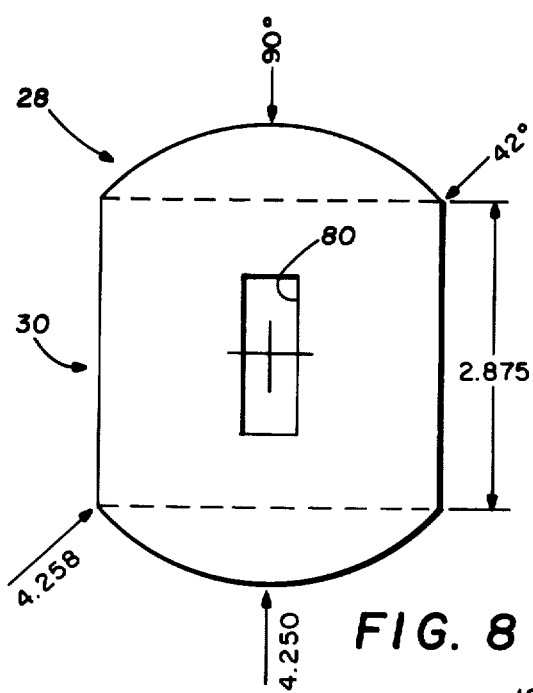
FIG. 8 is a top view of the ellipsoid valve member of the invention with legends representing the curvature thereof.

FIG. 8 is a top view of the ellipsoid valve member 28 according to the present invention. While it will be understood that valve members may be formed with a plurality of different sizes for different valve requirements, FIG. 8 illustrates a valve member which provides an internal flow aperture of 2.875 inches. In this embodiment, the diameter of the valve body taken at the indicated 90° angle is 4.250 inches. The diameter of the device taken at the indicated 42° is 4.258 inches. It will thus be seen that the valve member 28 is provided with an elliptical configuration in order to provide increased sealing of the seats 32 and 34 when in the open position, as previously described.

The present ellipsoid valve member thus comprises an ellipsoid or symmetrical ovoid body which may be defined as an exterior surface with all plane sections thereof being either ellipses or circles. The ellipsoid body is then truncated to form the truncated embodiment as shown in FIG. 8. The central diameter of the body is smaller than the diameter taken at 42°, as illustrated. This increased diameter along the major axis of the ellipsoid causes flexing and deformation of the seats 32 and 34 during rotation of the valve member 28 between closed and open positions. This deformation not only provides improved sealing in the open position, but provides wiping of the seats in order to prevent build-up or debris and the like.

Another important aspect of the present ellipsoid valve member is that the aperture 30 is formed along the major axis of the ellipsoid from which the truncated ellipsoid valve member 28 is formed. The aperture 30 is thus perpendicular to the minor axis of the ellipsoid. Because of this construction, when the ellipsoid valve member 28 is in the open position as shown in FIG. 1, the seats 32 and 34 are deformed to exert increased sealing. When the ellipsoid valve member 28 is rotated to the closed position, the aperture 30 is disposed transverse to the passage 14 and the seats 32 and 34 will be provided with less deformation. The seats will, however, also provide an excellent seal in the closed position as they conform to the exterior shape of member 28.

Figure 9:
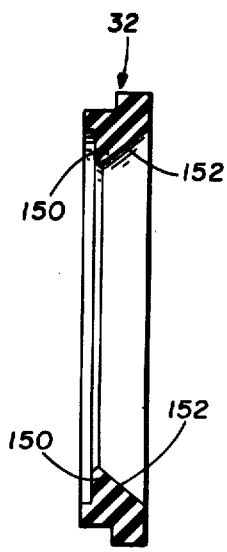
FIG. 9 is a sectional view of the valve seat illustrating the seat when in the normal closed position.
Figure 10:
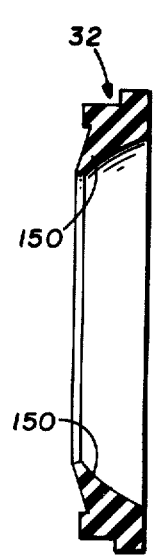
FIG. 10 is a cross-sectional view of the seat shown in FIG. 9 shown in a deformed configuration in the normal open position.

FIGS. 9 and 10 illustrate in a somewhat exaggerated manner the different degrees of deformation of the seat 12 during opening and closing of the valve body 28. FIG. 9 illustrates the seat 32 when the valve member 28 is in the closed position. In this configuration, the inwardly directed annular lips 150 of the seat are not substantially deformed and the surface 152 conforms to the circular configuration of the valve body member 28.

FIG. 10 illustrates the position of the seat 32 when the valve body member 28 is in the normal open position. In this position, the lips 150 may be seen to be outwardly deformed from the position shown in FIG. 9, thereby providing additional stress against the valve body 28 to prevent leakage when in the open position. This deformation of the lips 150 creates the wiping condition previously described in order to prevent build-up of debris and incrustation upon the seats.

In certain embodiments, such as use with nuclear reactors and the like, flange valves may be required to withstand extremely high pressures such as in the range of 2,000 to 2,500 p.s.i. In order to withstand such pressures, previously developed valves have often been required to be machined out of a single piece of stainless steel, which is a very expensive process. With the use of the present valve, a less expensive conventional steel body may be utilized with only stainless steel liners being required. In such environments as nuclear energy, such valves must also withstand very high temperatures such as up to 2,500° F. Normal resilient seat material will burn at this high temperature, and thus many prior valves have been unable to be used in such high pressure and high temperature environments.

The seats 32 and 34 shown in FIG. 1 are provided with springs 36 and 38 which will remain to provide sealing even though the resilient seats are incinerated by high temperatures. Thus, the present invention may be used in high pressure and high temperature environments.

Figure 11:
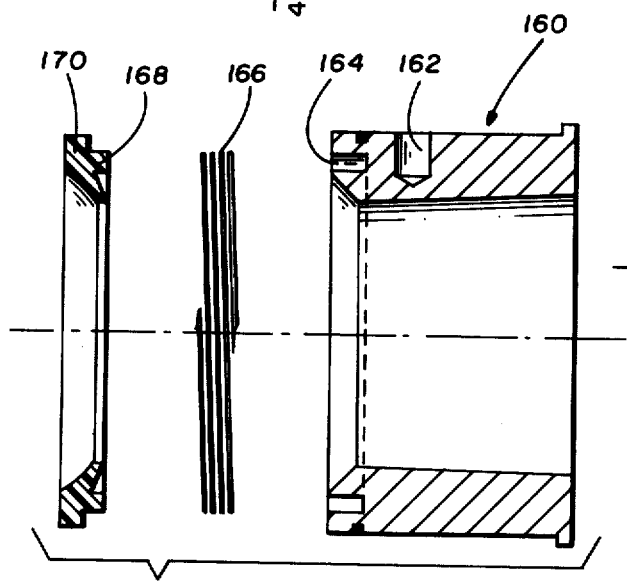
FIG. 11 is an exploded view of a second embodiment of an annular seat and liner for use with the present flange valve.

FIG. 11 illustrates another embodiment of the liner and seating arrangement of the present invention, wherein a liner 160 comprises a liner and insert molded in an integral annular piece. The use of the liner 160 thus will eliminate the requirement of two separate liners and inserts for each end of the valve as shown in FIG. 1. An aperture 162 is provided in the liner 160 for provision of the wear detector previously described. An annular slot 164 is provided to receive a metal spring 166 which is compressed within the slot 164 by a projection 168 extending from a seat 170. In this embodiment, the spring 166 provides continuous sealing pressure of seat 170 against the valve member 28 even though wear occurs in the seat.

Figure 12:
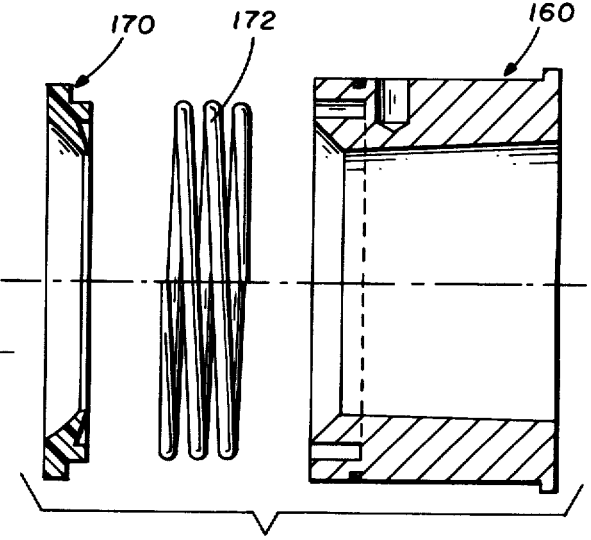
FIG. 12 is an exploded view of a third embodiment of a seat and liner for use with the present flange valve.

FIG. 12 illustrates an alternate embodiment of the embodiment shown in FIG. 11, with an identical insert 160 being provided. In this embodiment, a large diameter spring 172 is provided in order to exert substantial pressure upon the insert 170. It will thus be seen that the shape, size and operation of the springs utilized with this embodiment of the invention may be substantially varied according to the desired use of the invention. With the embodiment shown in FIGS. 11 and 12, the springs 166 and 172 may exert sealing pressure against the valve member on a temporary basis even though the seats 170 are incinerated or otherwise damaged because of excessively high temperatures.

Figure 13:
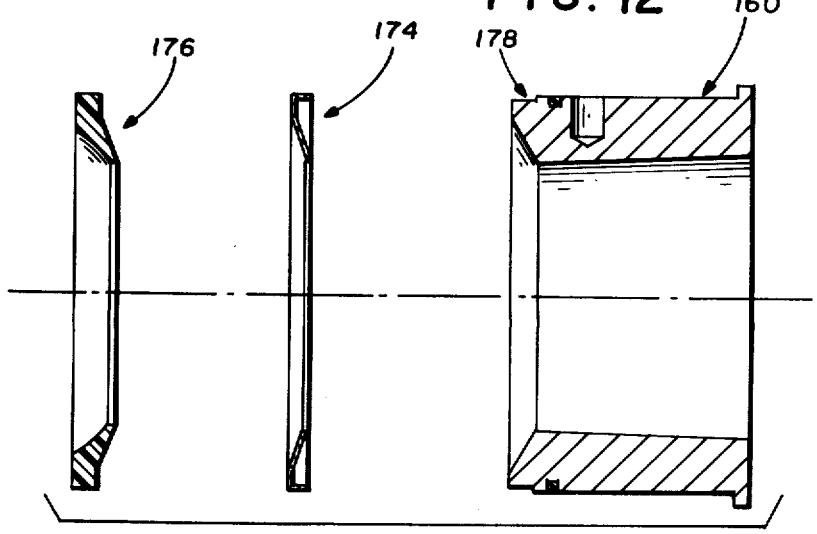
FIG. 13 is an exploded view of the fourth embodiment of a seat and liner configuration for use with the present flange valve.

FIG. 13 illustrates yet another variation of the present invention wherein insert 160 previously described is utilized in combination with a high heat resistant annular metal modified Belleville spring 174. A resilient seat 176 is shaped to conform to the exterior surface of the metal spring 174. Metal springs 174 conform with the face of the insert 160 and interfits an annular groove 178 formed about the end of the insert. When the combination shown in FIG. 13 is assembled, the metallic metal spring 174 can operate to provide a limited sealing for the invention even though the resilient seat 176 has been damaged by high temperatures.

Figure 14:
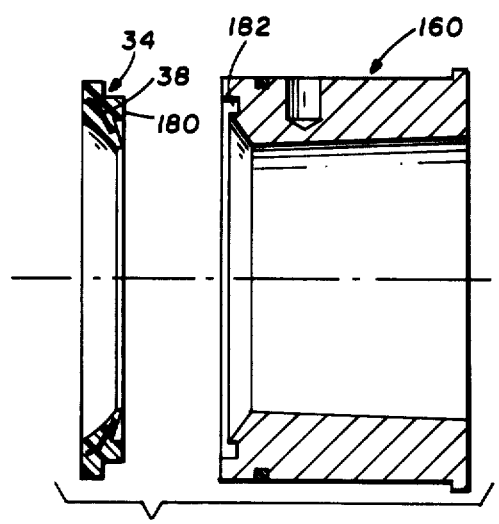
FIG. 14 is an exploded view of a fifth embodiment of a seat and liner for use with the present flange valve.

FIG. 14 illustrates the use of the insert 160 with the previously described seat 34. As previously noted, a metal spring 38, which may be termed a modified Belleville type spring, is molded within the resilient seat 34. A projection 180 extends from the seat and interfits within a slot 182 formed in the insert 160. The modified Belleville type spring 38 thus provides temporary sealing to a valve when used in a high temperature environment in case the resilient member 34 dissipates due to high heat. The insert 160 combines the insert 42 with the liner 46 in order to provide a single integral piece.

Figure 15:
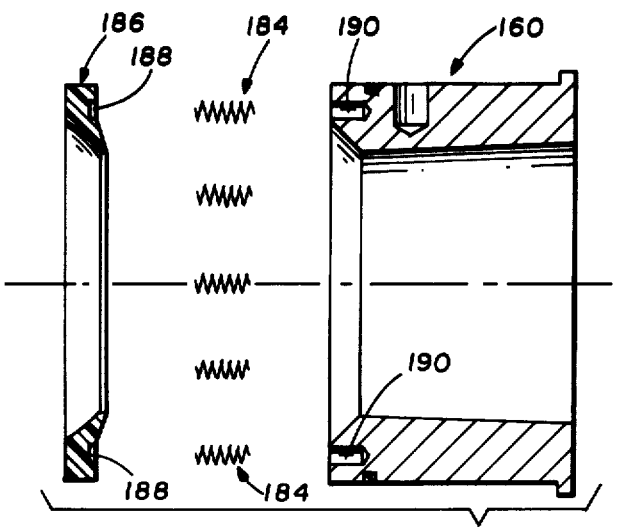
FIG. 15 is an exploded view of a sixth embodiment of a seat and liner arrangement for use with the present flange valve.

FIG. 15 illustrates another embodiment of the liner and seat configuration of the present invention, wherein a liner 160 is used in combination with a plurality of coil springs 184. Seat 186 is provided with a plurality of circular depressions 188 about the periphery thereof in order to receive the spring 184. The other end of the springs 184 are received by a plurality of circular depressions 190 formed about the periphery of the insert 160. Springs 184 maintain continuous pressure upon the seat 186 even when the seat is worn or becomes partially deteriorated.

Figure 16:
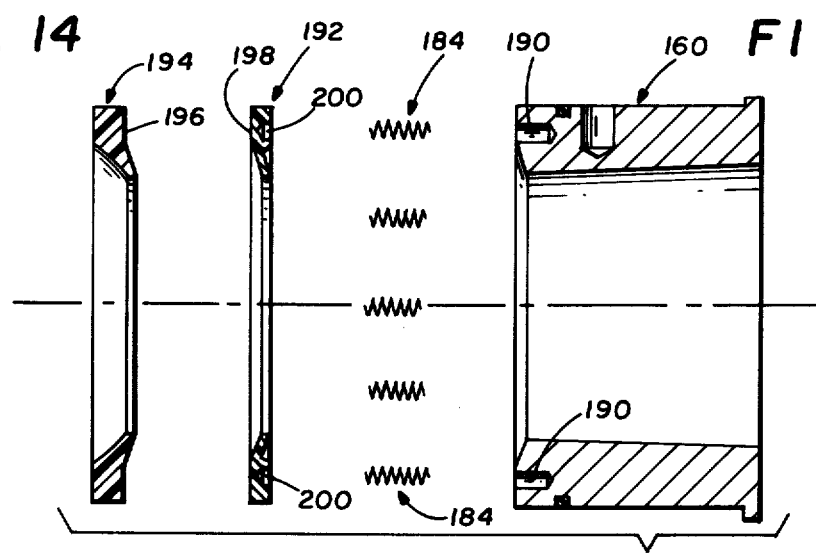
FIG. 16 is an exploded view of a seventh embodiment of a seal and liner for use with the present flange valve.

FIG. 16 illustrates the combination of FIG. 15, with the addition of a metal pressure plate 192. A resilient seat 194 is provided with a face 196 to conform with face 198 of the plate 192. Plate 192 is provided with a plurality of depressions 200 for receiving one end of the springs 184. Similarly, insert 150 is provided with a plurality of depressions 190 for receiving the other end of the springs 184. The pressure plate 192 provides even pressure against the resilient seat 194 even when deterioration of the resilient seat 194 occurs.

Figure 17:
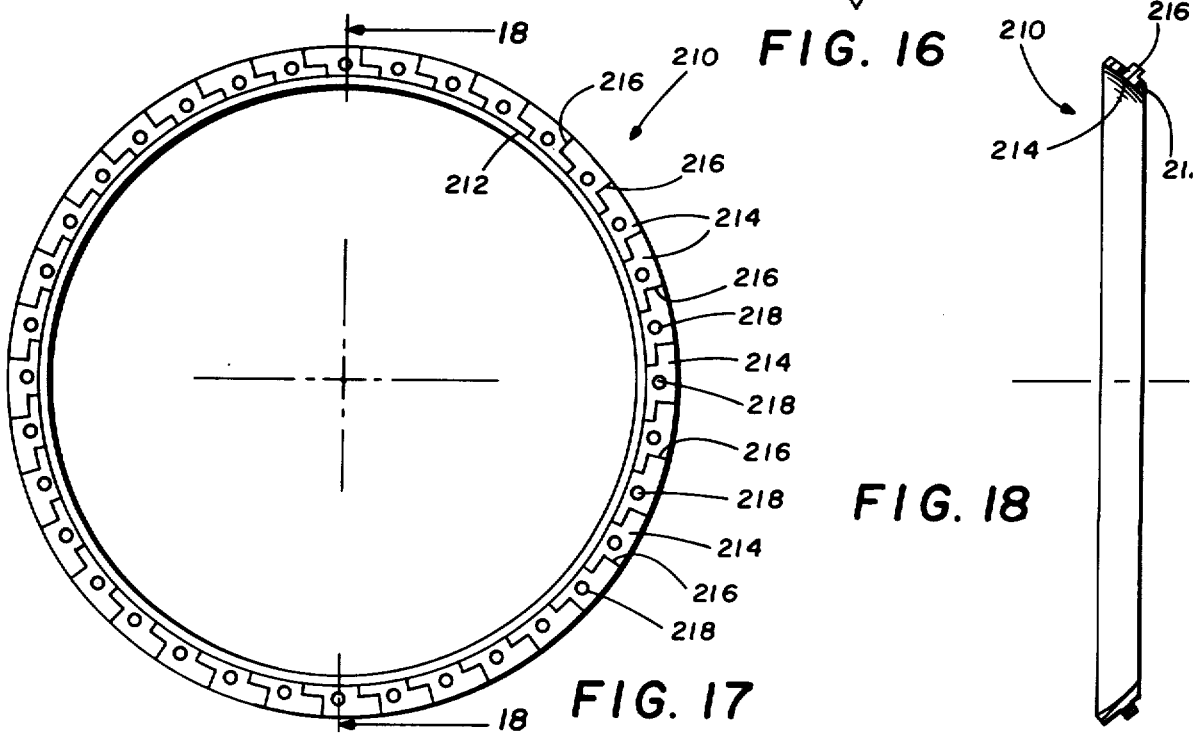
FIG. 17 is a front view of a seat member for use in an eighth embodiment of the present flange valve.
Figure 18:
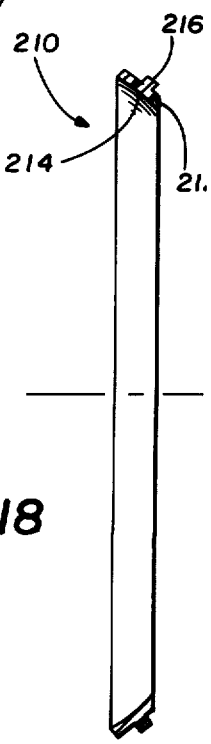
FIG. 18 is a sectional view of the seat shown in FIG. 17.

FIGS. 17-25 illustrate yet another embodiment of a valve member and seating arrangement which is particularly useful for high pressure and high temperature environments. FIGS. 17 and 18 illustrate a semi-soft molded seat segment 210. Segment 210 is comprised of annular metal member joined together by an annular ring 212 and includes a plurality of discrete metallic segments 214 separated by small cuts 216 and attached only at ring 212 such that the segment may move relative to one another. Each of the segments is provided with a small circular projection 218 for alignment purposes to be later described. FIG. 18 is a sectional view taken generally along the section lines 18-18 of FIG. 17 and illustrates that the sectional segments 214 are interconnected at the ring 212 and are angled outwardly. The seat thus formed provides a semi-soft molded metal seat for use with the combination to be shown in FIG. 25.

Figure 19:
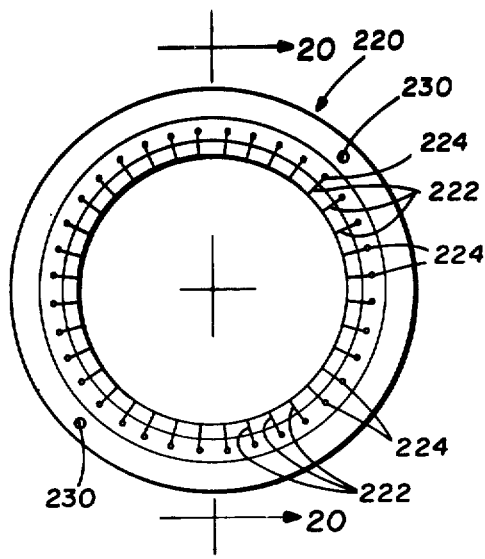
FIG. 19 is a front view of a seat for use in the eighth embodiment of a seat for use with the present flange valve.
Figure 20:
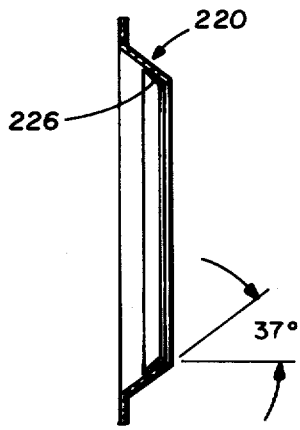
FIG. 20 is a cross-sectional view of the seat shown in FIG. 19 taken generally along the section lines 20—20.
Figure 22:
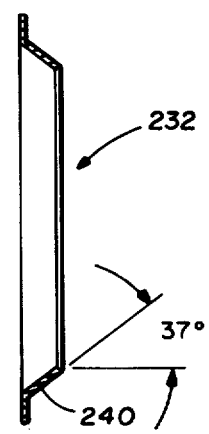
FIG. 22 is a cross-sectional view of the seat shown in FIG. 21 taken generally along the section lines 22—22.
Figure 21:
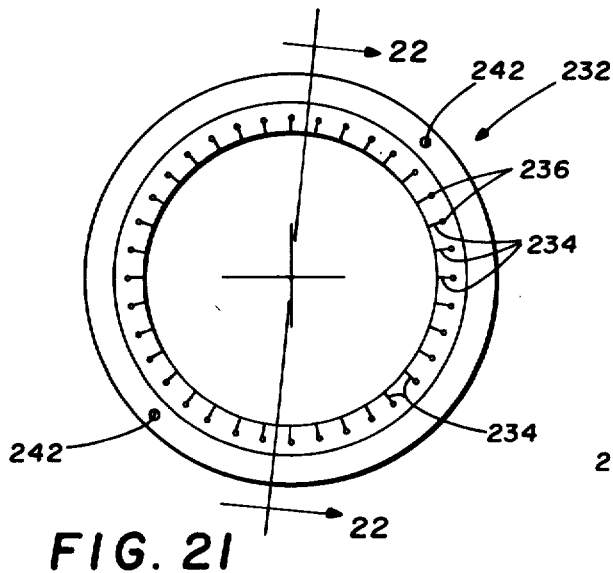
FIG. 21 is a front view of a seat for use in the eighth embodiment of a seat for use with the present flange valve.

FIGS. 19 and 20 illustrate a metal Belleville spring 220, which comprises a plurality of slits 222 terminating in small holes 224 to provide a spring action. As shown in the cross-section taken generally along the section lines 20—20 in FIG. 20, a graphited or sintered bronze element 226 is fused to the interior surface of the Belleville spring 220 to provide an annular member thereabout. Locating pin holes 230 are provided on opposite sides of the Belleville spring 220 to assist similarly in the manner to be subsequently described. FIGS. 21 and 22 illustrate the third element of the present seat combination which comprises a Belleville spring 232 with radial slits 234 terminating in small holes 236 much in the manner of the spring 220, but with somewhat different dimensions. As shown in FIG. 22, the Belleville spring 232 includes an outwardly sloped annular wall 240 which slopes at an angle of 37°. Pin locating holes 242 are provided to facilitate the final assembly.

Figure 25:
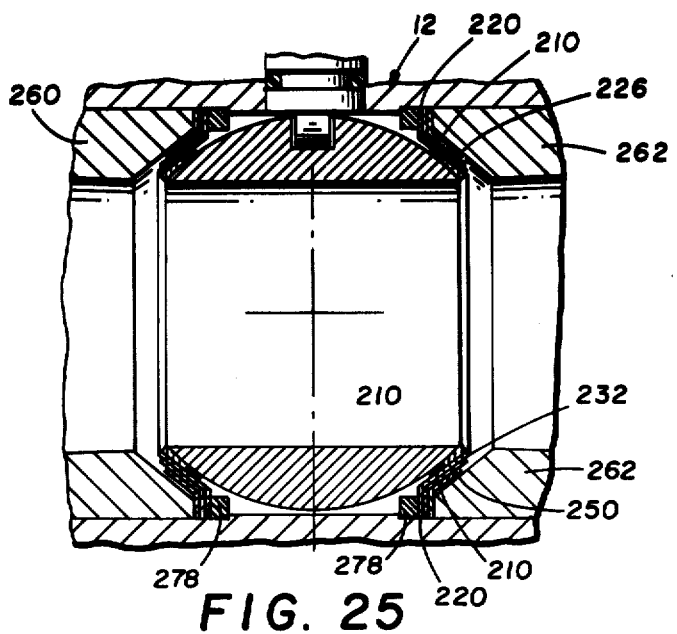
FIG. 25 is a cross-sectional view of the present ellipsoid valve utilizing the eighth embodiment of a seat configuration according to the invention.
Figure 24:
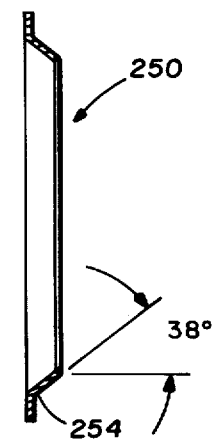
FIG. 24 is a cross-sectional view of the seat shown in FIG. 23 taken generally along the section lines 24—24.
Figure 23:
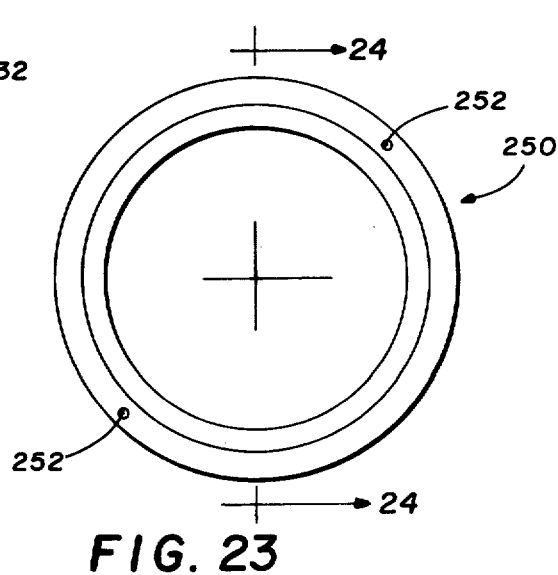
FIG. 23 is a front view of a seat for use in the eighth embodiment of a seat for use with the present flange valve.

FIGS. 23 and 24 illustrate the fourth element of the combination shown in FIG. 25, which comprises a plain Belleville spring 250 having pin locating holes 252. As shown in FIG. 24, the annular side 254 of the spring 250 slopes to the horizontal at approximately 38° in the preferred embodiment.

FIG. 25 illustrates the assembly of this embodiment of the invention. The ellipsoid valve member 28 is constructed in the manner previously described and combined liners and inserts 260 and 262 are inserted into the valve body as shown. The spring 220 shown in FIGS. 19 and 20 is assembled with the interlocking segments 210 shown in FIGS. 17 and 18. The segments 210 are abutted against the interior periphery of the annular fused element 226. The projections 216 are fitted within the holes 236 of the spring 232.

An annular spacer 278 is positioned against the annular shoulder formed in the valve body 12 and the spring 220 with the interlocked segments 210 are placed in abutment with the spacer 278 and in contact with the ellipsoid valve member in the manner illustrated. Spring 232 is mounted outside of spring 220, with the radial slits therein overlapping the slits in spring 220 to prevent leakage. Spring 250 is then mounted outside the remaining springs and exerts pressure and seals the slits against leakage. The springs are located and positioned by pins extending through the pin locating holes.

In operation of the seat combination shown in FIG. 25, the semi-soft interlocking segments 210 seal the holes and slits and the springs against interior leakage. The combination of seats provides a seal which cannot easily be distructed by high pressure and temperature and therefore provides a useful nuclear flange valve sealing combination.

The present invention thus provides an improved flange valve wherein interior parts may be loosened and removed and replaced after deterioration occurs after use of the valve. Because of the construction and operation of the valve, the exterior valve body will generally not be required to be replaced, thereby saving substantial expenditures. The present flange valve thus enables easy removal and installation of various interior components to enable the use of replacement kits, unlike many prior valves which have had to be completely replaced.

The present valve allows full flow of fluids or gaseous material therethrough without any substantial flow restriction or decrease in pressure of the fluid flow. The valve includes complete sealing and eliminates the possibility of the danger of explosion or extrusion of the seals by a high flow of material through the valve. The valve stem and the accompanying seal may be easily removed and replaced without removing the valve body from the conduit.

The double seats on opposite sides of the ellipsoid valve member are self-lubricating and provide a hermetic seal on the ellipsoid valve member. As previously noted, the construction of the ellipsoid valve member enables a greater seal against leakage when the valve is in the open position to prevent the corrosion of erosion of the interior housing surfaces. The provision of a non-corrosive thin coating on the interior of the housing also eliminates corrosion due to small amounts of corrosive material being carried by the ellipsoid valve member when turned to the closed position.

The present ellipsoid valve member is constructed so as to "float" within the valve body, and may be constructed with a port opening equivalent to or greater than the internal diameter of the conduit to which the flange valve is attached. The particular configuration of the ellipsoid valve member and the sealing seats provides a self-cleaning action due to deformation of the seats upon rotation of the valve member.

The present valve is particularly useful for high pressure flows of very corrosive material. The many different variations of non-destructive seats for use with the present invention enables the use of the present flange valve in high temperature and pressure environments such as in nuclear reactors and the like.

The present valve has been used in environments wherein highly corrosive material such as fluorospar slurry is utilized, and provides a lifetime greater than four times the lifetime of a conventional valve, with no evidence of corrosion of the valve and with no evidence of corrosion or leakage of the valve. With the use of the present liners of the invention, a less expensive metal may be used for a valve housing instead of expensive stainless steel or other expensive non-corrosive material.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A flange valve comprising:
    an integral metal valve body with a longitudinal central passage therethrough and having outwardly directed annular housing flanges at the ends thereof for connection to conduits,
    an ellipsoid valve member pivotally mounted within said central passage and having an aperture extending therethrough,
    annular resilient seats disposed within said passage and having inner annular portions with surfaces in contact with end portions of said valve member,
    a pair of removable annular liners disposed in opposite ends of said valve body and having end portions abutting said inner portions of said resilient seats, and liners dimensioned to be removably inserted from the exterior of said valve body into opposite ends of said central passage of said valve body to form a close fit such that said liners may be removed for repair or replacement from said central passage by sliding said liners in an outward direction along said central passage without the requirement of disassembly of said valve body; said liners constructed from non-corrosive material to prefent corrosion of said valve body, said liners having annular liner flanges which abut against the outer ends of said valve body and for being held in place by the conduits attached to said housing flanges, annular spacer rings having first and second ends and being disposed between said valve body and said annular liners with said first ends bearing against said resilient seats, said liner flanges engaging said second ends of said spacer rings to press said first ends of said spacer rings against said resilient seats to urge said resilient seats against said valve member, and means for rotating said valve member to open and closed positions.

2. The flange valve as defined in claim 1 wherein said valve member comprises a truncated ellipsoid member having major and minor axes with said aperture extending along the major axis, rotation of said ellipsoid member to said open position distorting said resilient seats to increase the sealing contact between said seat and said ellipsoid member in said open position and wherein rotation of said ellipsoid member from said closed to said open position provides, a wiping cleansing action of both said seats and ellipsoid member to dislodge flow material deposited upon said seats.

3. The flange valve of claim 1 and further comprising:
   a wear detector including an aperture extending through said valve body and partially through one of said liners, the end of said aperture spaced a predetermined distance from the interior surface of said liner so that said aperture is normally isolated from fluid pressure within said valve, and
   a detector plug slidably mounted within said aperture, said plug normally in an inward position and movable to an outwardly extended position by fluid pressure when said liner wears said predetermined distance.

4. The flange valve of claim 1 and further comprising spring means disposed between said resilient seats and said liners.

UNITED STATES PATENT AND TRADEMARK OFFICE
CERTIFICATE OF CORRECTION

PATENT NO. : 4,136,709
DATED : January 30, 1979
INVENTOR(S) : Philip W. Rogers; Claude E. Parkin It is certified that error appears in the above-identified patent and that said Letters Patent are hereby corrected as shown below:

Column 1, line 48, "pessure" should be --pressure--.

Column 2, line 9, "theretofore" should be --heretofore--.

Column 5, lines 59-60, "extensive" should be --extension--.

Column 8, line 68, "or" should be --of--.

Column 10, line 5, "seem" should be --seen--;
line 62, "seat" should be --seal--.

Column 11, line 43, "the annular" should be --an annular--.

Column 12, line 17, "corrosion of erosion" should be
--corrosion or erosion--;
line 68, "and liners" should be --said liners--.

Column 14, line 7, "provides," should be --provides--.

Signed and Sealed this

Twenty-fifth Day of September 1979

[SEAL]

Attest:

LUTRELLE F. PARKER
*Attesting Officer*   *Acting Commissioner of Patents and Trademarks*